UNITED STATES PATENT OFFICE.

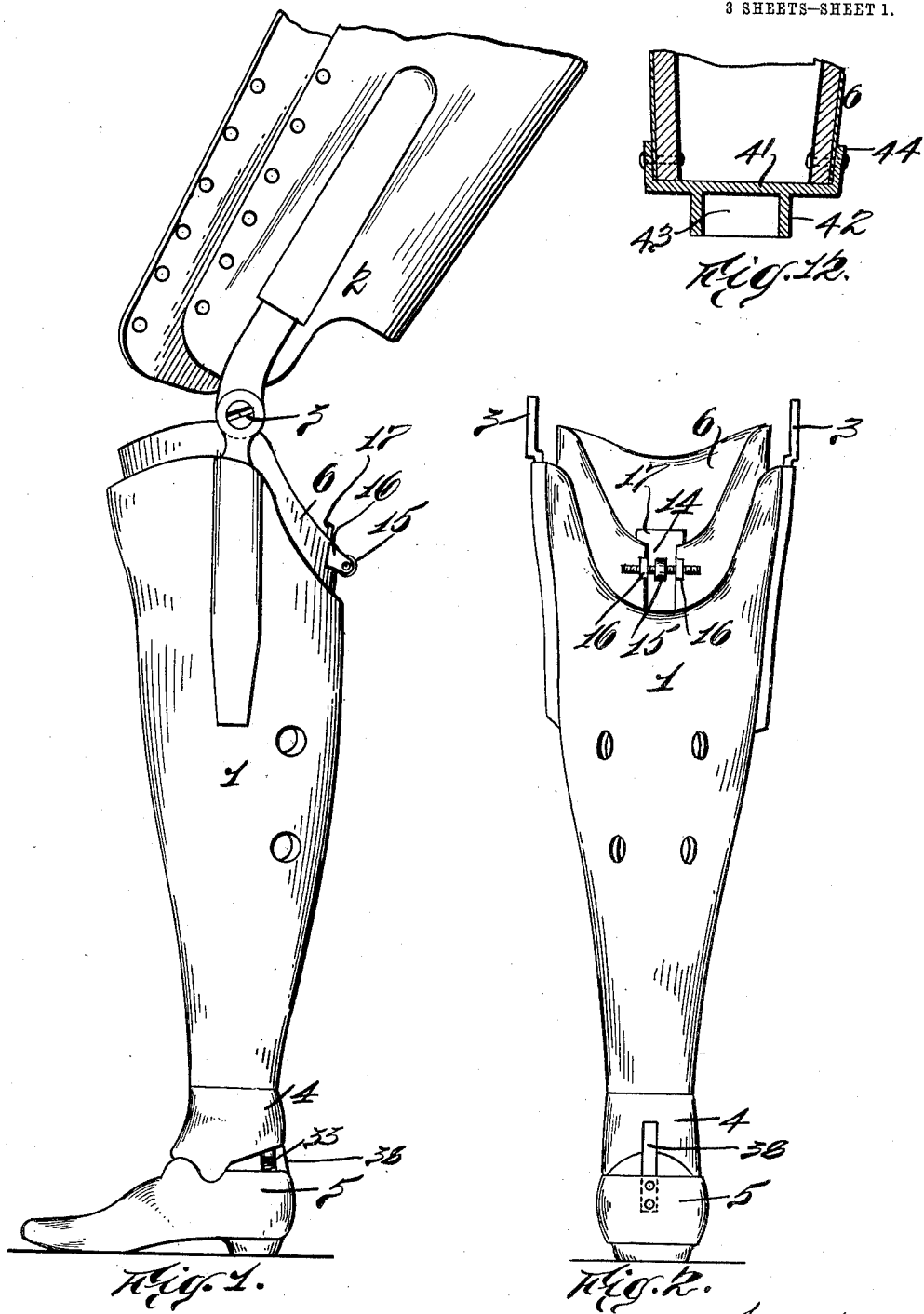

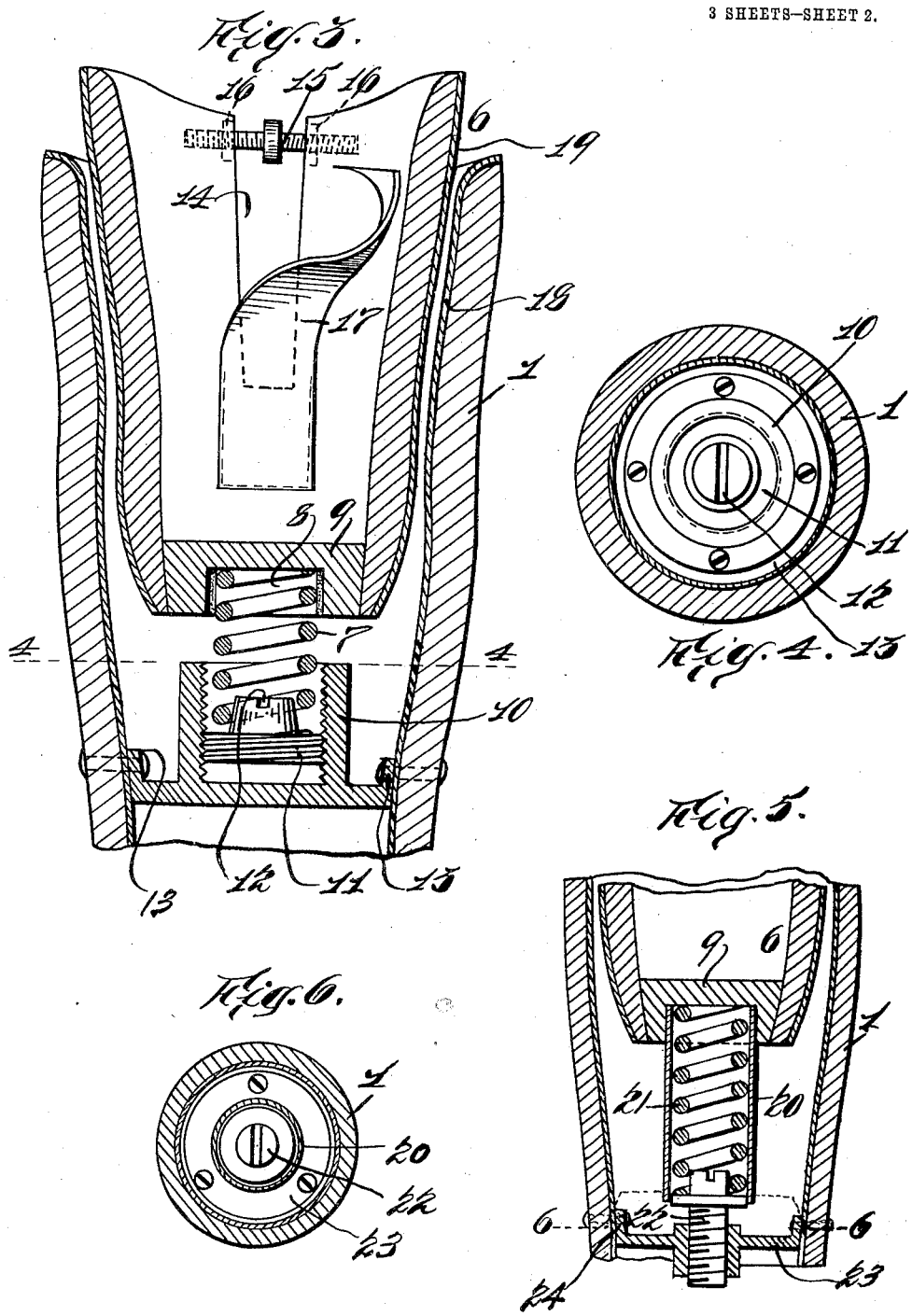

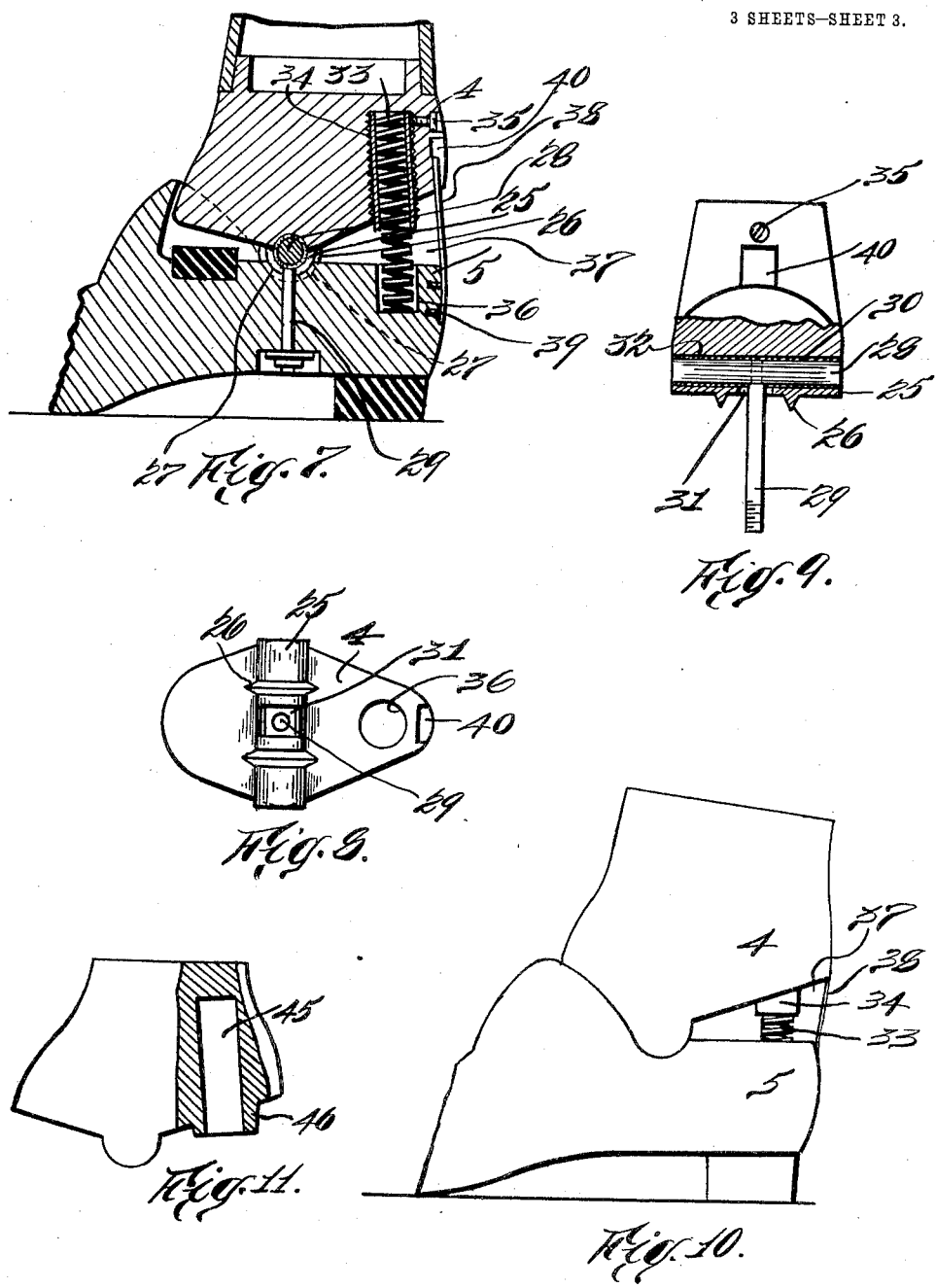

JOHN T. APGAR, OF NEW YORK, N. Y.

ARTIFICIAL LEG.

1,082,255.

Specification of Letters Patent.   Patented Dec. 23, 1913.

Application filed December 30, 1912. Serial No. 739,238.

*To all whom it may concern:*

Be it known that I, JOHN T. APGAR, a citizen of the United States of America, residing at New York city, borough of Manhattan, county and State of New York, have invented certain new and useful Improvements in Artificial Legs, of which the following is a full, clear, and exact description.

This invention relates to an improvement in artificial legs and pertains more particularly to novel means for yieldably supporting the socket, and for adjusting or regulating the tension of the yieldable supporting means.

Other features of my improvement will be hereinafter set forth and claimed.

I will now proceed to describe my invention in detail, the novel features of which I will point out in the appended claims, reference being had to the accompanying drawings, forming part hereof, wherein:—

Figure 1 is a side elevation of an artificial leg embodying my improvements; Fig. 2 is a rear elevation of the lower member thereof; Fig. 3 is an enlarged vertical sectional view of the upper portion of the lower leg-member; Fig. 4 is a cross-sectional plan view thereof, the section being taken on a line 4—4 in Fig. 3; Fig. 5 is a vertical sectional view of a modification of the device illustrated in Fig. 3; Fig. 6 is a cross-sectional plan view thereof, the section being taken on a line 6—6 in Fig. 5; Fig. 7 is a vertical sectional view of my improved ankle-block, and portion of the foot-member; Fig. 8 is a bottom plan view of the ankle-block; Fig. 9 is a rear elevation, partly in section, of the ankle-block; Fig. 10 is a diagrammatic side elevation, illustrating the ankle-block in its rearward position. Fig. 11 is a modified form of ankle-block, and Fig. 12 is a modified form of closure for the bottom of the stump socket.

In the drawings the numeral 1 indicates the lower member of an artificial leg, while 2 indicates the upper member which is laced to the stump above the knee, the members 1 and 2 being pivotally connected at 3. Thus far the leg constitutes a well-known structure provided with an ankle-block 4 and attached foot-member 5. It is usual to provide this form of artificial leg with a stump socket 6, which is designed to support for instance the stump of a leg which has been amputated below the knee. The stump which is carried by the socket 6 should be rendered fit to support its proportionate part of the weight of the body, but owing to the fact that these sockets are not designed to yield, so as to take considerable strain off the stump and also cushion the thrust thereupon, any great amount of weight cannot be placed upon the stump, and hence the other leg has to take the greater part of the weight. While walking, the artificial member is thrown forward by the remaining portion of the amputated member, but it is not thrown forwardly in a substantially straight line but rather to one side in order that the weight of the body will not be imposed directly upon the stump in a vertical direction, when the weight of the body is shifted to permit the normal leg to be thrown forward. Hence the limp. When disposed at an angle, the stump takes the weight, or at least the greater part of it on the inside thereof and not upon the end of the stump which is somewhat tender.

By referring to Fig. 3 it will be seen that the socket 6 is not secured to the member 1, but is free to move longitudinally thereof, so that when the weight of the body is imposed upon the stump, the socket will yield or move downwardly, thereby permitting the stump to gradually absorb the weight or accommodate itself to the imposed strain. To permit the socket to yield, I provide a cushioning or yielding element, in this instance a spring 7 which is fitted at the upper end thereof, in a pocket 8 in the bottom 9 of the socket 6. The lower end of the spring or cushioning element 7 is located in the threaded bore of a saddle 10 and rests upon an adjustable block 11 provided with a slot 12 by which the said block can be adjusted longitudinally of the bore of the saddle 10, in order that the tension of the spring 7 can be altered or adjusted to suit the weight imposed upon the stump socket supported thereby. By means of the adjustable support for the spring the tension thereof can be altered to suit the weight of the wearer of the leg. Furthermore, the adjustability of the yielding support for the socket makes it possible to alter the cushioning action thereof, or rather the degree of the cushioning action, should the wearer of the leg gain or lose weight. The saddle 10 is provided with flanges 13 which are riveted to the leg member 1.

The wearer of the leg can easily determine whether the cushioning medium is too stiff or too free for his weight. It would be almost impossible to temper a spring to produce a cushioning effect to meet all requirements; hence it is highly essential that some means be provided for adjusting the tension of the cushioning element. To adapt the socket 6 to be tightly secured to the leg-stump, I partly split or sever the same as at 14 and provide a turnbuckle 15 which engages brackets 16 on the socket. When the stump is placed in the pocket, the turnbuckle 15 can be manipulated to draw the socket tightly around the stump. An apron 17 is provided to cover the gap 14 so that the flesh will not protrude thereinto when the socket is tightened. It may here be stated that in practice the socket 6 fits the leg member 1 more closely than herein illustrated.

I have not and will not describe the construction of the leg elements, nor the sockets, excepting that rawhide and leather will be used, as is usual.

A further feature of my improvement resides in a lining 18 for the lower leg member and a covering 19 for the socket 6 to prevent the squeaking of the two members when in action. I prefer to make the elements 18 and 19 out of buckskin or some other similar material which when rubbed together will not squeak.

Fig. 5 illustrates a modified form of resilient support for the socket 6, and comprises a tubular member 20 carried by the bottom member 9 of the socket. The member 20 retains a spring 21, the lower end of which rests upon an adjustable post 22 which in turn is carried by a threaded plate 23 the said plate being carried by a flange 24, which is secured to the leg member 1. The adjustment of the tension of the spring 21 will be apparent.

A further advantageous feature of my invention consists of the ankle-block 4. (See Figs. 7 to 9 inclusive.) The chief object of this feature of my improved leg is to provide an ankle-block which will be more serviceable than those now in use; and to render the block more serviceable, I have improved the bearing portion of the block, or that part of the block which movably supports the device that holds the block in position on the foot portion of the leg.

Referring to Figs. 7, 8 and 9, the ankle-block 4 is provided with a trunnion-member 25 which is provided with circumferential ribs 26, which in turn enter curved grooves in the foot portion 5 in the manner usual in artificial leg construction. The ribs 26 prevent the side lashing of the block on the foot-portion. The foot-portion 5 is provided with curved recesses 27 which rotatably support the trunnion 25. The ankle-block is held in position on the foot, the trunnion 25 engaging the recess 27, by a journal 28 and bolt 29. To decrease the wear of the metal, I cover the journal 28 with a leather sleeve 30. The spindle 28, and cover 30 therefor, extend the full length of the bearing provided by the bore 32 of the trunnion 25. The trunnion 25 is provided with an opening 31 through which the bolt 29 passes and within which the said bolt can work. To gain the results desired, I cast or otherwise form the trunnion 25 integral with the block 4, the said block being preferably made out of aluminum. It is usual to secure these trunnions to the ankle-blocks by bolts which pass through the trunnion, hence it is not possible to rotatably support a journal, such as 28, throughout the full length of the trunnion, and consequently a good bearing surface cannot be obtained, so that these parts soon wear out. The object of the comparatively extensive bearing surface, provided by the above described construction is to adapt these parts to wear longer than they otherwise would.

A further feature of the ankle-block is the mounting of the heel spring 33 which is carried by the threaded tube 34. The tube 34 is screwed into the block 4 and is held against movement by a set-screw 35. The lower end of the spring 33 rests in a recess 36 in the foot portion 5. The tube 34 supports the spring, rendering it compressible and preventing it from buckling. One of the chief annoyances to a wearer of an artificial leg is the fact that a shoe, at the rear thereof, will crowd in the space 37 between the ankle-block and foot portion when the ankle portion is rocked backward, while a person is walking. To prevent this I provide the resilient member 38, which in this instance consists of a spring. The member 38 is fixed to the foot portion 5 at 39, the upper end thereof being slidably retained in a groove 40 in the ankle-block. When the ankle-block is rocked backwardly (see Fig. 10) the spring 38 will yield and move backwardly, thereby offering comparatively little or no resistance to the action of the ankle-block. The presence of the spring 38 prevents the shoe from crowding into the space 37. When the shoe crowds into the space 37 it hinders the action of the ankle-block.

Instead of providing the bottom of the stump socket 6 with the block 9, for the spring 7 to seat in, I may use a metal member 41 (see Fig. 12) which carries an annular flange 42 to provide a pocket 43 for the reception of the spring 7. The member 41 also carries a flange 44 to which the socket 6 is riveted. In lieu of the threaded tube 34, for the ankle-block 4, I may provide the said block with a core 45 (Fig. 11) to receive the spring 33, the said core being surrounded by an annular flange 46.

By referring to Figs. 1 and 2, it will be seen that the stump-socket 6 extends above the edge of the leg member 1, it being kept in such position by the tension device or cushion. The stump socket will be constructed so as to prevent the downward movement thereof from causing the upper edge of the socket 6 to go below the top edge of the leg member 1, the object being to prevent the stump socket from ever moving downwardly enough to make the artificial member shorter than the natural leg, thereby preventing a limp. In other words, the top edge of the stump 6 is slightly larger in diameter than the inside of the leg member 1; hence the stump-socket can never go below the top edge of the leg member 1.

Having now described my invention, what I claim and desire to secure by Letters Patent is:

1. The combination of an artificial leg-member, a stump socket carried thereby and normally free from the sides of the leg, a support carried by said leg-member, a spring interposed between said support and said stump socket, said spring being located centrally of the base of the stump socket and said support, and means to regulate the tension of said spring.

2. The combination of an artificial leg-member, a stump socket carried thereby, a threaded support carried by said leg member, a threaded block engaging the threads of the said support, a spring carried by said threaded block, said spring bearing against the lower end of the stump socket and located centrally thereof.

3. In combination with an ankle-block and a foot-portion movably secured thereto, a threaded tube screwed into said ankle-block, means for locking said threaded tube, and a spring carried by said tube, said foot-portion being provided with a socket adapted to receive the lower end of said spring.

Signed at New York city, N. Y., this 27th day of December, 1912.

JOHN T. APGAR.

Witnesses:
 EDWARD A. JARVIS,
 MAURICE BLOCH.

Copies of this patent may be obtained for five cents each, by addressing the "Commissioner of Patents, Washington, D. C."